US011197477B2

(12) United States Patent
Krause et al.

(10) Patent No.: US 11,197,477 B2
(45) Date of Patent: Dec. 14, 2021

(54) AQUEOUS CAPSULE SUSPENSION CONCENTRATES BASED ON 2-[(2,4-DICHLOROPHENYL)METHYL]-4,4'-DIMETHYL-3-ISOXAZOLIDINONE

(71) Applicant: BAYER CROPSCIENCE AKTIENGESELLSCHAFT, Monheim am Rhein (DE)

(72) Inventors: Jens Krause, Leverkusen (DE); Ralf Hambrock, Monheim (DE)

(73) Assignee: Bayer CropScience Aktiengesellschaft, Monheim am Rhein (DE)

( * ) Notice: Subject to any disclaimer, the term of this patent is extended or adjusted under 35 U.S.C. 154(b) by 36 days.

(21) Appl. No.: 16/322,541

(22) PCT Filed: Aug. 3, 2017

(86) PCT No.: PCT/EP2017/069701
§ 371 (c)(1),
(2) Date: Feb. 1, 2019

(87) PCT Pub. No.: WO2018/024839
PCT Pub. Date: Feb. 8, 2018

(65) Prior Publication Data
US 2019/0200614 A1 Jul. 4, 2019

(30) Foreign Application Priority Data
Aug. 4, 2016 (EP) .................................... 16182780

(51) Int. Cl.
*A01N 43/80* (2006.01)
*A01P 13/00* (2006.01)
*A01N 25/28* (2006.01)
(52) U.S. Cl.
CPC ............. *A01N 43/80* (2013.01); *A01N 25/28* (2013.01); *A01P 13/00* (2021.08)

(58) Field of Classification Search
None
See application file for complete search history.

(56) References Cited

U.S. PATENT DOCUMENTS

| 4,405,357 | A | 9/1983 | Change |
| 2004/0038824 | A1* | 2/2004 | Haesslin ............ A01N 2300/00 504/105 |
| 2016/0135462 | A1 | 5/2016 | Liu et al. |

FOREIGN PATENT DOCUMENTS

| WO | 96/14743 A1 | 5/1996 |
| WO | WO 2012/095436 * | 7/2012 |
| WO | 2012/148689 A2 | 11/2012 |
| WO | 2014/166347 A1 | 10/2014 |
| WO | 2015/127259 A1 | 8/2015 |

OTHER PUBLICATIONS

Balance Flexx label, Bayer CropScience, Research Triangle, NC (2015).*
Wilkins, Richard M., "Controlled release technology, agricultural" in: Kirk-Othmer Encyclopedia of Chemical Technology, John Wiley & Sons, vol. 7, pp. 551-573 (2015).*
International Search Report of International Patent Application No. PCT/EP2017/069701 dated Aug. 31, 2017.

* cited by examiner

*Primary Examiner* — John Pak
(74) *Attorney, Agent, or Firm* — McBee Moore & Vanik IP, LLC

(57) ABSTRACT

The present invention relates to aqueous capsule suspension concentrates based on 2-[(2,4-dichlorophenyl)methyl]-4,4'-dimethyl-3-isoxazolidinone, to the production thereof and to mixtures thereof with suspension concentrates, and to the use thereof as an agrochemical formulation.

17 Claims, No Drawings

AQUEOUS CAPSULE SUSPENSION CONCENTRATES BASED ON 2-[(2,4-DICHLOROPHENYL)METHYL]-4,4'-DIMETHYL-3-ISOXAZOLIDINONE

CROSS-REFERENCE TO RELATED APPLICATIONS

This application is a National Stage entry of International Application No. PCT/EP2017/069701, filed 3 Aug. 2017, which claims priority to European Patent Application No. 16182780.3, filed 4 Aug. 2016.

BACKGROUND

Field

The present invention relates to aqueous capsule suspension concentrates based on 2-[(2,4-dichlorophenyl)methyl]-4,4'-dimethyl-3-isoxazolidinone, to the production thereof and to mixtures thereof with suspension concentrates, and to the use thereof as an agrochemical formulation.

Description of Related Art

The active ingredient 2-[(2,4-dichlorophenyl)methyl]-4,4'-dimethyl-3-isoxazolidinone (CAS number 81777-95-9 or IPUAC 2-(2,4-dichlorobenzyl)-4,4-dimethyl-1,2-oxazolidin-3-one, abbreviated hereinafter to DCPMI), is a chemical derivative of clomazone (abbreviated hereinafter to CPMI, CAS 81777-89-1, IUPAC 2-(2-chlorobenzyl)-4,4-dimethyl-1,2-oxazolidin-3-one). By comparison with clomazone, DCPMI has much lower water solubility (39.5 ppm rather than 1000 ppm) and a somewhat lower vapour pressure (0.88 mPa compared to 19.2 mPa), and so the calculated Henry constant (distribution of the active ingredient through the water gas phase) is at a similar level. Both active ingredients belong to the class of the volatile active ingredients that can cause unwanted damage to neighbouring crops. The low vapour pressure may also be associated with an unwanted broad distribution, which should be prevented for reasons of human and environmental toxicology and for economic reasons.

DCPMI is used in herbicidal compositions and mixtures or employed as a selective grass herbicide, as described, for example, in WO-A 2015/127259 or WO-A 2012/148689.

EP-A 0 039 441 already discloses microcapsule suspensions for use in agriculture. The microcapsules disclosed therein are produced from gelatin and carbonyl compounds. The production of polyurethane/urea capsules referred to as (polyurethane capsules hereinafter) is not disclosed.

In WO-A 96/14743, clomazone is encapsulated with polyurethane. The volatility is reduced here down to 50%, but the ratio of clomazone to isocyanate is 1:1 to 6:1, and so the wall thickness of the polyurethane capsules is very high. In addition, the encapsulation is conducted with addition of polyfunctional amines, choosing a ratio of amine to isocyanate of 0.1:1 to 1:1.

WO-A 2015/143974 likewise discloses the encapsulation of CPMI, but with a urea-formaldehyde capsule.

WO-A 2015/143979 and WO-A 2015/143975 describe alternative, specific solvents for CPMI. WO-A 2014/166347 discloses the encapsulation of CPMI with polyacetylenecarbamides.

A disadvantage of the process described in the prior art is that the strength of the encapsulation leads to long-lasting release of the active ingredient, which is undesirable in the case of DCPMI. Since clomazone is used in a pre-emergence method on oilseed rape crops, release over a prolonged period is advantageous. DCPMI, by contrast, is used both in pre-emergence and post-emergence methods on cereal crops. Different grasses (e.g. black grass, ALOMY) are controlled here pre-emergence and post-emergence. For this purpose, preference is given to using a combination of the encapsulated active ingredient with unencapsulated active herbicidal ingredients. In this manner of application, a rapid effect is desired. In the event of late onset of action, the weeds and grasses may already be at too advanced a growth stage, such that successful control is no longer possible.

Furthermore, clomazone is an active ingredient which is liquid at RT that does not necessitate addition of organic solvents. By contrast, DCPMI has to be pre-dissolved in a suitable solvent. A disadvantage of the methods described in the prior art is that none of the encapsulations disclosed therein is suitable for the abovementioned specific use of DCPMI.

The problem addressed by the present invention was therefore that of providing a suitable encapsulation of DCPMI which reduces the volatility by at least 70% (in relative terms) and simultaneously reduces the active ingredient penetration by not more than 10%. In addition, a suitable solvent for DCPMI was to be found. Finally, a problem likewise addressed by the present invention was that of providing agrochemical formulations, preferably capsule suspension concentrates, comprising the DCPMI encapsulated in accordance with the invention and further active herbicidal ingredients, and for the use thereof for control of weeds in cereals and oilseed rape, in pre-emergence and post-emergence methods, preferably in pre-emergence methods on winter barley for control of grasses and here especially of black grass (ALOMY). The capsule suspension concentrates should additionally be miscible with suspension concentrates comprising further active agrochemical ingredients.

The problem was solved by the capsule suspension concentrates (CS) according to the invention.

SUMMARY

The present invention therefore provides capsule suspension concentrates comprising
A) a particulate disperse phase comprising
  a) a reaction product of at least one compound having isocyanate-reactive groups a1) and an isocyanate mixture a2),
  b) 2[(2,4-dichlorophenyl)methyl-4,4'-dimethyl]-3-isoxazolidinone, dissolved in an organic, water-insoluble solvent b1),
  c) one or more additives and
B) a liquid, aqueous phase,
wherein the particles of the disperse phase A) have a median particle size between 1 and 50 μm.

DETAILED DESCRIPTION OF A PREFERRED EMBODIMENT

Preferably, the CS according to the invention comprise at least one protective colloid c1).

The particle size is determined according to CIPAC (CIPAC=Collaborative International Pesticides Analytical Council; www.cipac.org) Method MT 187 as d50 or D90=active ingredient particle size (laser scattering of 50% or 90% of all volume particles). The median particle size refers to the d50 value.

The particles of the disperse phase A) have a median particle size d50 which is generally between 1 and 50 μm, preferably 1 to 20 μm, most preferably between 3 and 15 μm.

The present invention likewise provides a process for producing the capsule suspension concentrates according to the invention, characterized in that, in step (1), 2-[(2,4-dichlorophenyl)methyl]-4,4'-dimethyl-3-isoxazolidinone b), dissolved in an organic, water-insoluble solvent b1), is mixed with the isocyanate mixture a2) and optionally with an organic solvent and/or emulsifier, the solution thus prepared is then, in a (2) second step, emulsified in water comprising a protective colloid c1), optionally in a mixture with further additives c), and the emulsion thus prepared, in a (3) third step, is admixed with a1) and then additives c) are optionally added.

The amounts stated hereinafter, unless described otherwise, relate to the total amount of A) and B).

In a further embodiment of the process according to the invention, the emulsion obtained from the second step (2), in the third step (3) of the process according to the invention, can first be admixed with at least one diamine, polyamine, dialcohol, polyalcohol and/or amino alcohol a1) while stirring. The amine or alcohol components a1) are appropriately added here in aqueous solution. After the reaction that leads to capsule formation has ended, additives c) are optionally added. However, preference is given to using exclusively water as component a1) in the process according to the invention.

For production of the CS according to the invention, it is possible to use any apparatus customary for purposes of this kind that generates strong shear forces. Examples include rotor-stator mixers and jet dispersers.

In the performance of the process according to the invention, the ratio of NCO groups from component a2) to NCO-reactive groups from component a1) may be varied within a particular range. In general, 0.8 to 1.5 equivalents of amine or alcohol component are used per 1 mol of isocyanate. Preferably, the amounts of isocyanate and amine or alcohol are chosen such that equimolar amounts of isocyanate groups and of amino or hydroxyl groups are present.

In the performance of the process according to the invention, the reaction temperatures can be varied within a particular range.

The first stage (1) of the process according to the invention is generally conducted at temperatures between −10 and 80° C., preferably between 0° C. and 50° C., more preferably between 2° C. and 40° C., most preferably between 2° C. and 30° C., the second stage (2) generally at temperatures between −10° C. and +80° C., preferably between 0° C. and 80° C., and in the third stage (3) generally at temperatures between 0° C. and 80° C., preferably between 10° C. and 75° C.

The process according to the invention is conducted under atmospheric pressure.

The wall thickness of the capsules of the capsule suspension concentrates according to the invention is between 0.001 and 4 μm, preferably between 0.01 and 2 μm and most preferably between 0.01 and 1 μm.

In the reaction of a1) with a2), the sum total of the number-average functionality X of isocyanate groups and isocyanate-reactive groups is $2 \leq X \leq 6$, preferably $2 \leq X \leq 4.5$, more preferably $2.0 \leq X \leq 3.5$ and most preferably $2.2 \leq X \leq 2.8$.

The "number-average functionality X" feature in the process according to the invention is illustrated as follows. It is the compound of higher functionality that is crucial here, and the result of subtracting 2 from the compound of lower functionality is added to the compound of higher functionality. If, for example, the (average) functionality of a1) is 2.1 and that of a2) is 2.6: 2.1−2=0.1. This difference is added to 2.6: 2.6+0.1=2.7. The number-average functionality is thus 2.7. Alternatively, if a1) is 2.7 and a2) is 2.3, the number-average functionality is found to be 2.7+2.3−2=3.0.

The capsule suspension concentrates according to the invention feature a number of advantages. For instance, they are capable of releasing the active components in the amount required in each case over a prolonged period. It is also favourable that the plant compatibility of the active ingredients present is improved, and volatility and hence damage to neighbouring crops are reduced. Moreover, the acute toxicity of the active components is reduced, and so the deployment of the microcapsule formulations is unproblematic to the operators even without any great safety precautions.

Useful compounds having isocyanate-reactive group a1) include aliphatic, aromatic, cyclic and alicyclic primary and secondary diamines, and also polyamines Examples include ethylenediamine (1,2), diethylenetriamine, monoisopropylamine, 4-aminopyridine (4-AP), n-propylamine, ethylene- or propylenimine-based polyaziridine, triethylenetetraamine (TETA), tetraethylenepentamine, 2,4,4'-triaminodiphenyl ether, bis(hexamethylene)triamine, ethylenediamine (EDA), trimethylenedipiperidine (TMDP), guanidine carbonate (GUCA), phenylenediamine, toluenediamine, pentamethylenehexamine, 2,4-diamino-6-methyl-1,3,5-triazine, 1,2-diaminocyclohexane, 4,4'-diaminodiphenylmethane, 1,5-diaminonaphthalenisophoronediamine, diaminopropane, diaminobutane, piperazine, aminoethylenepiperazine (AEP), poly(propylene glycol) bis(2-aminopropyl ether) or o,o'-bis(2-aminopropyl)polypropylene glycol-block-polyethylene glycol-block-polypropylene glycol, hexamethylenediamine, bis(3-aminopropyl)amine, bis(2-methylaminoethyl)methylamine, 1,4-diaminocyclohexane, 3-amino-1-methylaminopropane, N-methylbis(3-aminopropyl)amine, 1,4-diamino-n-butane and 1,6-diamino-n-hexane. Preference is given to hexamethylenediamine and diethylenetriamine.

Useful compounds having isocyanate-reactive group a1) likewise include primary and secondary, aliphatic and aromatic dialcohols and polyalcohols. Examples include: ethanediol, propanediol (1,2), propanediol (1,3), butanediol (1,4), pentanediol (1,5), hexanediol (1,6), glycerol and diethylene glycol. Preference is given to using glycerol and propane-1,2-diol.

Compounds having isocyanate-reactive group a1) also include amino alcohols. Examples include triethanolamine, monoethanolamine, triisopropanolamine, diisopropylamine, N-methylethanolamine, N-methyldiethanolamine.

In a very particularly preferred embodiment, water is used as isocyanate-reactive component a1). It is reacted in situ with the isocyanate (poly/di) to give an amine (poly/di). It is likewise possible to use blends of a1). Preference is given to exclusively water.

The isocyanate mixture a2) is a mono-, di- and/or polyisocyanate mixture, or a reaction product of isocyanate mixtures. Suitable compound a2) are, for example, butylene 1,4-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes (H12-MDI) and mixtures thereof with any isomer content, cyclohexylene 1,4-diisocyanate, 4-isocyanatomethyloctane 1,8-diisocyanate (nonane triisocyanate), phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI), 1,3- and/or 1,4-bis(2-isocyanatoprop-2-yl)benzene (TMXDI), 1,3-bis(isocyanatomethyl)benzene (XDI), alkyl 2,6-diisocyanatohexanoates (lysine diisocyanates) having alkyl groups having 1 to 8 carbon atoms, and mixtures thereof. Compounds comprising modifications such as allophanate, uretdione, urethane, isocyanurate, biuret, iminooxadiazinedione or oxadiazinetrione structure and based on said diisocyanates are also suitable units for component a2), as also are polycyclic compounds, for example polymeric MDI (pMDI, for instance PAPI-27 from Dow or Desmodur® 44V20 products from Covestro AG) and combinations of the above.

Preference is given to modifications having an isocyanate (NCO) functionality of 2 to 6, preferably of 2.0 to 4.5 and more preferably of 2.3 to 4.2 and most preferably of 2.3 to 3.8. Especially preferred is an NCO functionality of 2.4 to 2.8.

Preference is given to modification using diisocyanates from the group of HDI, IPDI, H12-MDI, TDI and MDI. Particular preference is given to TDI and MDI, and derivatives thereof. Especially preferred MDI is polymeric MDI such as PAPI-27 used in a blend with TDI. The preferred NCO content of the isocyanate or polyisocyanate or blend is between 3% and 50% by weight, more preferably between 10% and 40% by weight, more preferably between 15% and 35% by weight and most preferably between 18% and 30% by weight. The isocyanate groups may also be present in partially or completely blocked form prior to their reaction with the isocyanate-reactive groups, in such a way that they cannot react immediately with the isocyanate-reactive group. This ensures that the reaction does not take place until a particular temperature (blocking temperature) has been reached. Typical blocking agents can be found in the prior art and are selected such that they are eliminated again from the isocyanate group at temperatures between 60 and 220° C., according to the substance, and only then react with the isocyanate-reactive group. There are blocking agents which become incorporated into the polyurethane, and there are also those which remain as solvents or plasticizers in the polyurethane, or are evolved as gases from the polyurethane. The expression "blocked NCO values" is sometimes used. When the expression "NCO values" is used in the invention, this always refers to the unblocked NCO value. The usual extent of blocking is up to <0.5%. Examples of typical blocking agents are caprolactam, methyl ethyl ketoxime, pyrazoles, for example 3,5-dimethyl-1,2-pyrazole or 1,-pyrazole, triazoles, for example 1,2,4-triazole, diisopropylamine, diethyl malonate, diethylamine, phenol and derivatives thereof, and imidazole.

Component a2) may also be used in the form of a mixture of the above compounds or else of a prepolymer. In this case, for example, a compound containing isocyanate groups and having an NCO content between 3% and 50% by weight is reacted with compounds containing toward isocyanate-reactive groups and having an OH number between 10 mg KOH/g and 150 mg KOH/g.

Very particular preference is given to using a mixture of polymeric (p)MDI and TDI. The ratio of the pMDI to tolylene diisocyanate here may be varied within a particular ratio, preference being given to using 0.2% to 2% by weight of pMDI and 0.2% to 2% by weight of TDI.

The aqueous phase B) of the capsule suspension concentrates according to the invention may, as well as water, also comprise further additives c) such as emulsifiers, protective colloids, preservatives, defoamers, cold stabilizers, thickeners, pH stabilizers and neutralizing agents. Preferred components c) are emulsifiers, thickeners and protective colloids c1).

Useful organic solvents b1) include all customary organic solvents that on the one hand have low miscibility with water, but on the other hand dissolve the active agrochemical ingredients used with good solubility. Preferred examples include aliphatic and aromatic, optionally halogenated hydrocarbons such as toluene, xylene, Solvesso® 100, 100ND, 150, 150 ND or 200, 200 ND (mineral oil), tetrachloromethane, chloroform, methylene chloride and dichloroethane, and also esters such as ethyl acetate, and alkanecarboxamides such as N,N-dimethyloctanamide and N,N-dimethyldecanamide. In addition come vegetable oils and modified oil (for example by methylation, ethylation and also hydrogenation and hydration) based, for example, on rapeseed oil, maize kernel oil, coconut oil or the like. Particular preference is given to using mineral oil, very particular preference to using solvents based on a from dialkylnaphthalene (for example diisopropylnaphthalene), and mixture of 1-methyl- and 2-methylnaphthalene and naphthalene (for example Solvesso® 200 ND products, CAS No.: 64742-94-5).

Useful emulsifiers c) include standard surface-active substances present in formulations of active agrochemical ingredients. Examples include ethoxylated nonylphenols, polyethylene glycol ethers of linear alcohols, reaction products of alkylphenols with ethylene oxide and/or propylene oxide, and also fatty acid esters, alkylsulfonates, alkyl sulfates and aryl sulfates.

Useful protective colloids c1) (dispersants) include all substances typically used for this purpose. Preferred examples include natural and synthetic water-soluble polymers such as gelatin, starch and cellulose derivatives, especially cellulose esters and cellulose ethers, such as methyl cellulose, and also polyvinyl alcohols, partly hydrolysed polyvinyl acetates, lignosulfonates (such as Borresperse® NA, REAX® 88 Kraftsperse® 25 S), modified naphthalenesulfonates (for instance Morwet D-425), polyvinylpyrrolidones and polyacrylamides. Particular preference is given to using polyvinyl alcohols, partly hydrolysed polyvinyl acetates and lignosulfonates. Most preferably polyvinyl alcohols.

Useful thickeners c) include organic thickeners and inorganic thickeners. Useful organic thickeners include organic natural or biotechnologically modified or organic synthetic thickeners. Typical synthetic thickeners are Rheostrux® (Croda) or the Thixin® or Thixatrol® series (Elementis). These are typically based on acrylates. Typical organic thickeners are based on xanthan or cellulose (for instance hydroxyethyl or carboxymethyl cellulose) or a combination thereof. Further typical representatives are based on cellulose or lignin. Preference is given to using natural modified thickeners based on xanthan. Typical representatives are, for example, Rhodopol® (Solvay) and Kelzan® (Kelco Corp.), and also Satiaxane® (Cargill). Preference is likewise given to silicas and attapulgites.

Useful preservatives c) include all substances typically present for this purpose in crop protection compositions. Examples include Acticide® SPX (Thor) and Proxel® GXL (Lonza).

Useful defoamers c) include all substances typically usable for this purpose in crop protection compositions. Preference is given to silane derivatives, such as polydimethylsiloxanes, and magnesium stearate. Typical products are Silcolapse® 484 (Solvay, Silioxane Emulsion) and SAG 1571 (Momentive) used.

Substances that function as cold stabilizers c) may be all of those typically usable for this purpose in crop protection compositions. Examples include urea, glycerol and propylene glycol.

Useful neutralizing agents c) include customary acids and bases. Examples include phosphoric acid, citric acid, sodium hydroxide solution and aqueous ammonia solution.

The composition of the capsule suspension concentrates according to the invention can be varied within a particular range. The proportion of the disperse phase A) in relation to the overall formulation is generally between 10% and 90% by weight, preferably between 30% and 70% by weight, more preferably between 40% and 60% by weight.

The proportion of a) is generally between 0.1% and 8% by weight, preferably between 0.2% and 4.5% by weight, more preferably between 0.3% and 2.5% by weight, the proportion of active agrochemical ingredient b) is generally between 1% and 50% by weight, preferably between 5% and 40% by weight, more preferably between 10% and 20% by weight, the proportion of organic solvent b1) is generally between 1% and 90% by weight, preferably between 10% and 60% by weight, more preferably between 20% and 40% by weight and most preferably between 25% and 40% by weight, the proportion of protective colloids c1) is generally between 0.1% and 5% by weight, preferably between 0.2% and 3% by weight, more preferably between 0.3% and 1.5% by weight, and the proportion of additives c) is generally between 0.1% and 15% by weight, preferably between 0.3% and 10% by weight and more preferably between 0.4% and 3% by weight.

In respect of the abovementioned proportions of the respective ingredients, it will be clear to the person skilled in the art that the preferred ranges for the individual ingredients can be combined freely with one another, and so these compositions of different preferred ranges for individual ingredients are also considered to be disclosed.

However, particular preference is given, unless stated otherwise, to preferred ranges from the same level, i.e. all preferred or more preferred ranges, and a specific disclosure is not intended to replace these general combinations but to add to them.

The same applies to other specifications of preferred ranges elsewhere in the present description.

In a preferred embodiment, the proportion of a) is between 0.1% and 8% by weight,
the proportion of active agrochemical ingredient b) is between 1% and 50% by weight,
the proportion of organic solvent b1) is between 10% and 60% by weight,
the proportion of protective colloids c1) is between 0.1% and 5% by weight,
and the proportion of additives c) is between 0.1% and 15% by weight.

In a further-preferred embodiment, the proportion of a) is between 0.1% and 8% by weight,
the proportion of active agrochemical ingredient b) is between 1% and 50% by weight,
the proportion of organic solvent b1) is between 20% and 40% by weight,
the proportion of protective colloids c1) is between 0.1% and 5% by weight,
and the proportion of additives c) is between 0.1% and 15% by weight.

In an even further-preferred embodiment, the proportion of a) is between 0.1% and 8% by weight,
the proportion of active agrochemical ingredient b) is between 1% and 50% by weight,
the proportion of organic solvent b1) is between 25% and 40% by weight,
the proportion of protective colloids c1) is between 0.1% and 5% by weight,
and the proportion of additives c) is between 0.1% and 15% by weight.

In a further embodiment, the proportion of a) is between 0.1% and 8% by weight,
the proportion of active agrochemical ingredient b) is between 1% and 50% by weight,
the proportion of organic solvent b1) is between 1% and 90% by weight,
the proportion of protective colloids c1) is between 0.1% and 5% by weight,
and the proportion of additives c) is between 0.1% and 15% by weight.

In a further embodiment, the proportion of a) is between 0.2% and 4.5% by weight,
the proportion of active agrochemical ingredient b) is between 5% and 40% by weight,
the proportion of organic solvent b1) is between 10% and 60% by weight,
the proportion of protective colloids c1) is between 0.2% and 3% by weight,
and the proportion of additives c) is between 0.3% and 10% by weight.

In a further preferred embodiment, the proportion of a) is between 0.2% and 4.5% by weight,
the proportion of active agrochemical ingredient b) is between 10% and 20% by weight,
the proportion of organic solvent b1) is between 20% and 40% by weight,
the proportion of protective colloids c1) is between 0.3% and 1.5% by weight,
and the proportion of additives c) is between 0.4% and 3% by weight.

In a further embodiment, the proportion of a) is between 0.3% and 2.5% by weight,
the proportion of active agrochemical ingredient b) is between 10% and 20% by weight,
the proportion of organic solvent b1) is between 20% and 40% by weight,
the proportion of protective colloids c1) is between 0.3% and 1.5% by weight,
and the proportion of additives c) is between 0.4% and 3% by weight.

In a further embodiment, the proportion of a) is between 0.3% and 2.5% by weight,
the proportion of active agrochemical ingredient b) is between 10% and 20% by weight,
the proportion of organic solvent b1) is between 25% and 40% by weight,
the proportion of protective colloids c1) is between 0.3% and 1.5% by weight,
and the proportion of additives c) is between 0.4% and 3% by weight.

Preferably, the ratio of active agrochemical ingredient b) to the isocyanate mixture a2) is between 7:1 and 40:1, preferably between 8:1 and 20:1, more preferably between 9:1 and 18:1.

If amino-functional compounds are used as component a1), the ratio of aminic isocyanate-reactive groups a1) to the isocyanate mixture a2) is between 0 and 1, preferably between 0 and 0.5, more preferably between 0 and 0.3. It is most preferably 0, meaning that no amino-functional compounds a1) are used.

Moreover, the organic solvent (B1) in the aforementioned embodiments is preferably a mineral oil, further preferably a solvent based on dialkylnaphthalene (for example diisopropylnaphthalene), or else a mixture of 1-methyl- and 2-methylnaphthalene and naphthalene (for example Solvesso® 200 ND products, CAS No.: 64742-94-5), where a as solvent a mixture of 1-methyl- and 2-methylnaphthalene and naphthalene is very particularly preferred.

In addition, in these embodiments, preference is given to using water as isocyanate-reactive component a1), further preferably with the mixture of 1-methyl- and 2-methylnaphthalene and naphthalene a as solvent. In a preferred embodiment, the capsule suspension concentrates (CS) according to the invention are blended with one or more suspension concentrate(s) (SC) to give a ZC formulation.

The present invention likewise provides ZC formulations comprising the CS formulations according to the invention and at least one suspension concentrate (SCs) comprising
one or more active herbicidal ingredients a') and/or one or more safeners s),
at least one or more than one thickener c),
one or more anionic emulsifiers e1) and
one or more nonionic emulsifiers e2).

Preferably, the ZC formulations according to the invention comprise
one or more safeners s),
at least one or more than one thickener c),
at least one or more than one anionic emulsifier e1),
at least one or more than one nonionic emulsifier e2) and
at least one or more than one carrier material f).

Likewise preferably, the ZC formulations according to the invention comprise
one or more active herbicidal ingredients a') and one or more safeners s),
at least one or more than one thickener c),
at least one or more than one anionic emulsifier e1),
at least one or more than one nonionic emulsifier e2) and
at least one or more than one carrier material f).

Preferred active herbicidal ingredients a') are aclonifen, aminopyralid, benzofenap, bifenox, bromoxynil, bromoxynil butyrate, potassium heptanoate and octanoate, butachlor, clomazone, clopyralid, 2,4-D also comprising the following frequently used forms: 2,4-D-butotyl, 2,4-D-butyl, 2,4-D-dimethylammonium, 2,4-D-diolamine (2,4-D-diethanolammonium), 2,4-D-ethyl, 2,4-D-2-ethylhexyl, 2,4-D-isobutyl, 2,4-D-isooctyl, 2,4-D-isopropyl, 2,4-D-isopropylammonium, 2,4-D-sodium, 2,4-D-triisopropanolammonium, 2,4-D-trolamine (2,4-D-triethanolammonium, diflufenican, dimethachlor, dimethenamid, dimethenamid-P, ethoxysulfuron, fenoxaprop, fenoxaprop-P, penoxaprop-ethyl, fenoxaprop-P-ethyl, fenquinotrione, fentrazamide, florasulam, flufenacet, fluroxypyr, fluroxypyr-meptyl, foramsulfuron, halauxifen-methyl, iodosulfuron iodosulfuron-methyl-sodium, isoxaflutole, MCPA (4-chloro-2-methylphenoxy) acetic acid, also comprising the following frequently used forms: MCPA-butotyl, MCPA-dimethylammonium, MCPA-isoctyl, MCPA-sodium, MCPA-potassium, MCPA-2-ethylhexyl, mefenacet, mesosulfuron, mesosulfuron-methyl, metazachlor, metolachlor, S-metolachlor, metosulam, metribuzin, napropamid, nicosulfuron, oxadiargyl, oxadiazon, pendimethalin, pethoxamid, picloram, propoxycarbazone, propoxycarbazone-sodium, propyzamid, prosulfocarb, pyrasulfotole, pyroxasulfone, pyroxsulam, quinmerac, tefuryltrione, tembotrione, thiencarbazone, thiencarbazone-methyl, triafamone.

Components s) used may also be the following groups of compounds (safeners):
s1) Compounds from the group of heterocyclic carboxylic acid derivatives:
s1$^a$) Compounds of the dichlorophenylpyrazoline-3-carboxylic acid type (S1$^a$), preferably compounds such as 1-(2,4-dichlorophenyl)-5-(ethoxycarbonyl)-5-methyl-2-pyrazoline-3-carboxylic acid, ethyl 142,4-dichlorophenyl)-5-(ethoxycarbonyl)-5-methyl-2-pyrazoline-3-carboxylate (S1-1) ("mefenpyr-diethyl"), and related compounds as described in WO-A-91/07874;
s1$^b$) Derivatives of dichlorophenylpyrazolecarboxylic acid (S1$^b$), preferably compounds such as ethyl 1-(2,4-dichlorophenyl)-5-methylpyrazole-3-carboxylate (S1-2), ethyl 1-(2,4-dichlorophenyl)-5-isopropylpyrazole-3-carboxylate (S1-3), ethyl 1-(2,4-dichlorophenyl)-5-(1,1-dimethylethyl)pyrazole-3-carboxylate (S1-4) and related compounds as described in EP-A-333 131 and EP-A-269 806;
s1$^c$) Derivatives of 1,5-diphenylpyrazole-3-carboxylic acid (S1$^c$), preferably compounds such as ethyl 1-(2,4-dichlorophenyl)-5-phenylpyrazole-3-carboxylate (S1-5), methyl 1-(2-chlorophenyl)-5-phenylpyrazole-3-carboxylate (S1-6) and related compounds as described, for example, in EP-A-268554;
s1$^d$) Compounds of the triazolecarboxylic acid type (S1$^a$), preferably compounds such as fenchlorazole (ethyl ester), i.e. ethyl 1-(2,4-dichlorophenyl)-5-trichloromethyl-(1H)-1,2,4-triazole-3-carboxylate (S1-7), and related compounds, as described in EP-A-174 562 and EP-A-346 620;
s1$^e$) Compounds of the 5-benzyl- or 5-phenyl-2-isoxazoline-3-carboxylic acid or of the 5,5-diphenyl-2-isoxazoline-3-carboxylic acid type (S1$^e$), preferably compounds such as ethyl 5-(2,4-dichlorobenzyl)-2-isoxazoline-3-carboxylate (S1-8) or ethyl 5-phenyl-2-isoxazoline-3-carboxylate (S1-9) and related compounds as described in WO-A-91/08202, or 5,5-diphenyl-2-isoxazolinecarboxylic acid (S1-10) or ethyl 5,5-diphenyl-2-isoxazoline-3-carboxylate (S1-11) ("isoxadifen-ethyl") or n-propyl 5,5-diphenyl-2-isoxazoline-3-carboxylate (S1-12) or ethyl 5-(4-fluorophenyl)-5-phenyl-2-isoxazoline-3-carboxylate (S1-13), as described in patent application WO-A-95/07897.
s2) Compounds from the group of the 8-quinolinoxy derivatives (S2):
s2$^a$) Compounds of the 8-quinolinoxyacetic acid type (S2$^a$), preferably 1-methylhexyl (5-chloro-8-quinolinoxy)acetate ("cloquintocet-mexyl") (S2-1), 1,3-dimethylbut-1-yl (5-chloro-8-quinolinoxy)acetate (S2-2), 4-allyloxybutyl (5-chloro-8-quinolinoxy)acetate (S2-3), 1-allyloxyprop-2-yl (5-chloro-8-quinolinoxy)acetate (S2-4), ethyl (5-chloro-8-quinolinoxy)acetate (S2-5), methyl 5-chloro-8-quinolinoxyacetate (S2-6), allyl (5-chloro-8-quinolinoxy)acetate (S2-7), 2-(2-propylideneiminoxy)-1-ethyl (5-chloro-8-quinolinoxy)acetate (S2-8), 2-oxoprop-1-yl (5-chloro-8-quinolinoxy) acetate (S2-9) and related compounds, as described in EP-A-86 750, EP-A-94 349 and EP-A-191 736 or EP-A-0 492 366, and also (5-chloro-8-quinolinoxy) acetic acid (S2-10), hydrates and salts thereof, for example the lithium, sodium, potassium, calcium, magnesium, aluminium, iron, ammonium, quaternary ammonium, sulfonium or phosphonium salts thereof, as described in WO-A-2002/34048;
s2$^b$) Compounds of the (5-chloro-8-quinolinoxy)malonic acid type (S2$^b$), preferably compounds such as diethyl (5-chloro-8-quinolinoxy)malonate, diallyl (5-chloro-8-quinolinoxy)malonate, methyl ethyl (5-chloro-8-quinolinoxy)malonate and related compounds, as described in EP-A-0 582 198.

s3) Active ingredients of the dichloroacetamide type (S3), which are frequently used as pre-emergence safeners (soil-acting safeners), for example "dichlormid" (N,N-diallyl-2,2-dichloroacetamide) (S3-1), "R-29148" (3-dichloroacetyl-2,2,5-trimethyl-1,3-oxazolidine) from Stauffer (S3-2), "R-28725" (3-dichloroacetyl-2,2-dimethyl-1,3-oxazolidine) from Stauffer (S3-3), "benoxacor" (4-dichloroacetyl-3,4-dihydro-3-methyl-2H-1,4-benzoxazine) (S3-4), "PPG-1292" (N-allyl-N-[(1,3-dioxolan-2-yl)methyl]dichloroacetamide) from PPG Industries (S3-5), "DKA-24" (N-allyl-N-[(allylaminocarbonyl)methyl]dichloroacetamide) from Sagro-Chem (S3-6), "AD-67" or "MON 4660" (3-dichloroacetyl-1-oxa-3-azaspiro[4.5]decane) from Nitrokemia or Monsanto (S3-7), "TI-35" (1-dichloroacetylazepane) from TRI-Chemical RT (S3-8), "Diclonon" (Dicyclonon) or "BAS145138" or "LAB145138" (S3-9)

((RS)-1-dichloroacetyl-3,3,8a-trimethylperhydropyrrolo[1,2-a]pyrimidin-6-one) from BASF, "furilazole" or "MON 13900" ((RS)-3-dichloroacetyl-5-(2-furyl)-2,2-dimethyloxazolidine) (S3-10), and the (R) isomer thereof (S3-11).

s4) Compounds from the class of the acylsulfonamides (S4):

S4$^a$) N-Acylsulfonamides of the formula (S4$^a$) and salts thereof, as described in WO-A-97/45016,

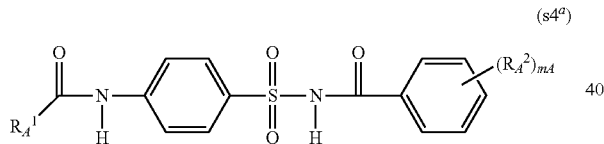

(s4$^a$)

in which $R_A^1$ is ($C_1$-$C_6$alkyl, ($C_3$-$C_6$)cycloalkyl, cycloalkyl, where the 2 latter radicals are substituted by $v_A$ substituents from the group of halogen, ($C_1$-$C_4$)alkoxy, ($C_1$-$C_6$) haloalkoxy and ($C_1$-$C_4$)alkylthio and, in the case of cyclic radicals, also by ($C_1$-$C_4$)alkyl and ($C_1$-$C_4$)haloalkyl;

$R_A^2$ is halogen, ($C_1$-$C_4$)alkyl, ($C_1$-$C_4$)alkoxy, $CF_3$;

$m_A$ is 1 or 2;

$v_A$ is 0, 1, 2 or 3;

s4$^b$) Compounds of the 4-(benzoylsulfamoyl)benzamide type of the formula (S4$^b$) and salts thereof, as described in WO-A-99/16744,

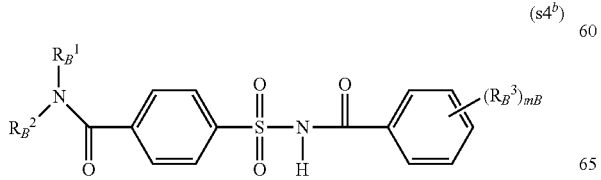

(s4$^b$)

in which $R_B^1$, $R_B^2$ are independently hydrogen, ($C_1$-$C_6$)alkyl, ($C_3$-$C_6$)cycloalkyl, ($C_3$-C6)alkenyl, ($C_3$-$C_6$)alkynyl, $R_B^3$ is halogen, ($C_1$-$C_4$)alkyl, ($C_1$-$C_4$)haloalkyl or ($C_1$-$C_4$)alkoxy and $M_B$ is 1 or 2, for example those in which $R_B^1$=cyclopropyl, $R_B^2$=hydrogen and $(R_B^3)$=2-OMe ("cyprosulfamide", S4-1), $R_B^1$=cyclopropyl, $R_B^2$=hydrogen and $(R_B^3)$=5-Cl-2-OMe (S4-2), $R_B^1$=ethyl, $R_B^2$=hydrogen and $(R_B^3)$=2-OMe (S4-3), $R_B^1$=isopropyl, $R_B^2$=hydrogen and $(R_B^3)$=5-Cl-2-OMe (S4-4) and $R_B^1$=isopropyl, $R_B^2$=hydrogen and $(R_B^3)$=2-OMe (S4-5);

s4$^c$) Compounds from the class of the benzoylsulfamoylphenylureas of the formula (S4$^c$), as described in EP-A-365484,

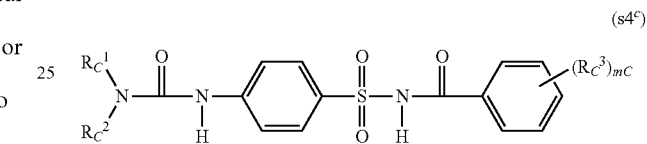

(s4$^c$)

in which $R_C^1$, $R_C^2$ are independently hydrogen, ($C_1$-$C_8$)alkyl, ($C_3$-$C_8$)cycloalkyl, ($C_3$-$C_6$)alkenyl, ($C_3$-$C_6$)alkynyl, $R_C^3$ is halogen, ($C_1$-$C_4$)alkyl, ($C_1$-$C_4$)alkoxy, $CF_3$ and $m_C$ is 1 or 2;

for example

1-[4-(N-2-methoxybenzoylsulfamoyl)phenyl]-3-methylurea,

1-[4-(N-2-methoxybenzoylsulfamoyl)phenyl]-3,3-dimethylurea,

1-[4-(N-4,5-dimethylbenzoylsulfamoyl)phenyl]-3-methylurea;

s4$^d$) Compounds of the N-phenylsulfonylterephthalamide type of the formula (S4$^d$) and salts thereof, which are known, for example, from CN 101838227,

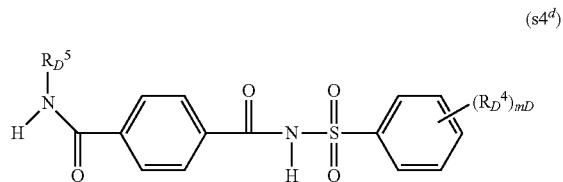

(s4$^d$)

in which $R_D^4$ is halogen, ($C_1$-$C_4$)-alkyl, ($C_1$-$C_4$)-alkoxy, $CF_3$;

$m_D$ is 1 or 2;

$R_D^5$ is hydrogen, ($C_1$-$C_6$)-alkyl, ($C_3$-$C_6$)-cycloalkyl, ($C_2$-$C_6$)-alkenyl, ($C_2$-$C_6$)-alkynyl or ($C_5$-$C_6$)-cycloalkenyl.

s5) Active ingredients from the class of the hydroxyaromatics and the aromatic-aliphatic carboxylic acid derivatives (S5), for example ethyl 3,4,5-triacetoxybenzoate, 3,5-dimethoxy-4-hydroxybenzoic acid, 3,5-dihydroxybenzoic acid, 4-hydroxysalicylic acid, 4-fluorosalicylic acid, 2-hydroxycinnamic acid, 2,4- dichlorocinnamic acid, as described in WO-A-2004/084631, WO-A-2005/015994, WO-A-2005/016001.

s6) Active ingredients from the class of the 1,2-dihydroquinoxalin-2-ones (S6), for example 1-methyl-3-(2-thienyl)-1,2-dihydroquinoxalin-2-one, 1-methyl-3-(2-thienyl)-1,2-dihydroquinoxaline-2-thione, 1-(2-aminoethyl)-3-(2-thienyl)-1,2-dihydroquinoxalin-2-one hydrochloride, 1-(2-methylsulfonylaminoethyl)-3-(2-thienyl)-1,2-dihydroquinoxalin-2-one, as described in WO-A-2005/112630.

s7) Compounds from the class of the diphenylmethoxyacetic acid derivatives (S7), for example methyl diphenylmethoxyacetate (CAS Reg. No. 41858-19-9) (S7-1), ethyl diphenylmethoxyacetate or diphenylmethoxyacetic acid, as described in WO-A-98/38856.

s8) Compounds of the formula (S8), as described in WO-A-98/27049,

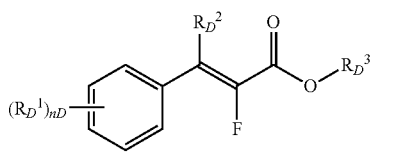

(s8)

in which the symbols and indices are defined as follows:
$R_D^1$ is halogen, $(C_1-C_4)$-alkyl, $(C_1-C_4)$-haloalkyl, $(C_1-C_4)$-alkoxy, $(C_1-C_4)$-haloalkoxy,
$R_D^2$ is hydrogen or $(C_1-C_4)$-alkyl,
$R_D^3$ is hydrogen, $(C_1-C_8)$-alkyl, $(C_2-C_4)$-alkenyl, $(C_2-C_4)$-alkynyl or aryl, where each of the aforementioned carbon-containing radicals is unsubstituted or substituted by one or more, preferably up to three identical or different radicals from the group consisting of halogen and alkoxy; or salts thereof,
$n_D$ is an integer from 0 to 2.

s9) Active ingredients from the class of the 3-(5-tetrazolylcarbonyl)-2-quinolones (S9), for example 1,2-dihydro-4-hydroxy-1-ethyl-3-(5-tetrazolylcarbonyl)-2-quinolone (CAS Reg. No.: 219479-18-2), 1,2-dihydro-4-hydroxy-1-methyl-3-(5-tetrazolylcarbonyl)-2-quinolone (CAS Reg. No. 95855-00-8), as described in WO-A-1999/000020.

s10) Compounds of the formula (S10$^a$) or (S10$^b$) as described in WO-A-2007/023719 and WO-A-2007/023764,

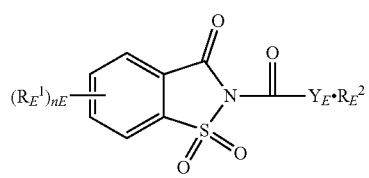

(s10$^a$)

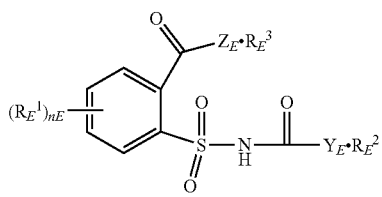

(s10$^b$)

in which
$R_E^1$ is halogen, $(C_1-C_4)$-alkyl, methoxy, nitro, cyano, $CF_3$, $OCF_3$
$Y_E$, $Z_E$ are independently O or S,
$n_E$ is an integer from 0 to 4,
$R_E^2$ is $(C_1-C_{16})$-alkyl, $(C_2-C_6)$-alkenyl, $(C_3-C_6)$-cycloalkyl, aryl; benzyl, halobenzyl,
$R_E^3$ is hydrogen or $(C_1-C_6)$-alkyl.

s11) Active ingredients of the oxyimino compound type (S11), which are known as seed-dressing agents, for example
"oxabetrinil" ((Z)-1,3-dioxolan-2-ylmethoxyimino (phenyl)acetonitrile) (S11-1), which is known as a seed-dressing safener for millet/sorghum against metolachlor damage,
"fluxofenim" (1-(4-chlorophenyl)-2,2,2-trifluoro-1-ethanone O-(1,3-dioxolan-2-ylmethyl)oxime) (S11-2), which is known as a seed-dressing safener for millet/sorghum against metolachlor damage, and
"cyometrinil" or "CGA-43089" ((Z)-cyanomethoxyimino(phenyl)acetonitrile) (S11-3), which is known as a seed-dressing safener for millet/sorghum against metolachlor damage.

s12) Active ingredients from the class of the isothiochromanones (S12), for example methyl [(3-oxo-1H-2-benzothiopyran-4(3H)-ylidene)methoxylacetate (CAS Reg. No. 205121-04-6) (S12-1) and related compounds from WO-A-1998/13361.

s13) One or more compounds from group (S13):
"naphthalic anhydride" (1,8-naphthalenedicarboxylic anhydride) (S13-1), which is known as a seed-dressing safener for corn against thiocarbamate herbicide damage,
"fenclorim" (4,6-dichloro-2-phenylpyrimidine) (S13-2), which is known as a safener for pretilachlor in sown rice,
"flurazole" (benzyl 2-chloro-4-trifluoromethyl-1,3-thiazole-5-carboxylate) (S13-3), which is known as a seed-dressing safener for millet/sorghum against alachlor and metolachlor damage,
"CL 304415" (CAS Reg. No. 31541-57-8) (4-carboxy-3,4-dihydro-2H-1-benzopyran-4-acetic acid) (S13-4) from American Cyanamid, which is known as a safener for corn against damage by imidazolinones,
"MG 191" (CAS Reg. No. 96420-72-3) (2-dichloromethyl-2-methyl-1,3-dioxolane) (S13-5) from Nitrokemia, which is known as a safener for corn,
"MG 838" (CAS Reg. No. 133993-74-5) (2-propenyl 1-oxa-4-azaspiro[4.5]decane-4-carbodithioate) (S13-6) from Nitrokemia
"disulfoton" (O,O-diethyl S-2-ethylthioethyl phosphorodithioate) (S13-7),
"dietholate" (O,O-diethyl O-phenyl phosphorothioate) (S13-8),
"mephenate" (4-chlorophenyl methylcarbamate) (S13-9).

s14) Active ingredients which, in addition to herbicidal action against weeds, also have safener action on crop plants such as rice, for example
"dimepiperate" or "MY-93" (S-1-methyl 1-phenylethylpiperidine-1-carbothioate), which is known as a safener for rice against damage by the herbicide molinate,
"daimuron" or "SK 23" (1-(1-methyl-1-phenylethyl)-3-p-tolylurea), which is known as safener for rice against imazosulfuron herbicide damage, "cumyluron"="JC-940" (3-(2-chlorophenylmethyl)-1-(1-methyl-1-phenylethyl)urea, see JP-A-60087254), which is known as safener for rice against damage by some herbicides, "methoxyphenone" or "NK 049" (3,3'-dimethyl-4-methoxybenzophenone), which is known as a safener for rice against damage by some herbicides, "CSB" (1-bromo-4-(chloromethylsulfonyl)benzene) from Kumiai, (CAS Reg. No. 54091-06-4), which is known as a safener against damage by some herbicides in rice.

s15) Compounds of the formula (S15) or tautomers thereof

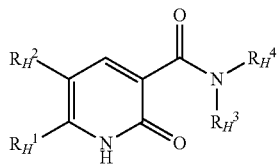

(s15)

as described in WO-A-2008/131861 and WO-A-2008/131860
in which
$R_H^1$ is a $(C_1-C_6)$-haloalkyl radical and
$R_H^2$ is hydrogen or halogen and
$R_H^3$, $R_H^4$ are each independently hydrogen, $(C_1-C_{16})$-alkyl, $(C_2-C_{16})$-alkenyl or $(C_2-C_{16})$-alkynyl,
where each of the 3 latter radicals is unsubstituted or substituted by one or more radicals from the group of halogen, hydroxyl, cyano, $(C_1-C_4)$-alkoxy, $(C_1-C_4)$-haloalkoxy, $(C_1-C_4)$-alkylthio, $(C_1-C_4)$-alkylamino, di[$(C_1-C_4)$-alkyl]amino, [$(C_1-C_4)$-alkoxy]carbonyl, [$(C_1-C_4)$-haloalkoxy]carbonyl, $(C_3-C_6)$-cycloalkyl which is unsubstituted or substituted, phenyl which is unsubstituted or substituted, and heterocyclyl which is unsubstituted or substituted, or $(C_3-C_6)$-cycloalkyl, $(C_4-C_6)$-cycloalkenyl, $(C_3-C_6)$-cycloalkyl fused on one side of the ring to a 4 to 6-membered saturated or unsaturated carbocyclic ring, or $(C_4-C_6)$-cycloalkenyl fused on one side of the ring to a 4 to 6-membered saturated or unsaturated carbocyclic ring,
where each of the 4 latter radicals is unsubstituted or substituted by one or more radicals from the group of halogen, hydroxyl, cyano, $(C_1-C_4)$alkyl, $(C_1-C_4)$haloalkyl, $(C_1-C_4)$alkoxy, $(C_1-C_4)$haloalkoxy, $(C_1-C_4)$alkylthio, $(C_1-C_4)$alkylamino, di[$(C_1-C_4)$alkyl]amino, [$(C_1-C_4)$alkoxy]carbonyl, [$(C_1-C_4)$haloalkoxy]carbonyl, $(C_3-C_6)$cycloalkyl which is unsubstituted or substituted, phenyl which is unsubstituted or substituted, and heterocyclyl which is unsubstituted or substituted,
or
$R_H^3$ is $(C_1-C_4)$-alkoxy, $(C_2-C_4)$-alkenyloxy, $(C_2-C_6)$-alkynyloxy or $(C_2-C_4)$-haloalkoxy and
$R_H^4$ is hydrogen or $(C_1-C_4)$-alkyl or
$R_H^3$ and $R_H^4$ together with the directly bonded nitrogen atom are a four- to eight-membered heterocyclic ring which, as well as the nitrogen atom, may also contain further ring heteroatoms, preferably up to two further ring heteroatoms from the group of N, O and S, and which is unsubstituted or substituted by one or more radicals from the group of halogen, cyano, nitro, $(C_1-C_4)$alkyl, $(C_1-C_4)$haloalkyl, $(C_1-C_4)$alkoxy, $(C_1-C_4)$haloalkoxy and $(C_1-C_4)$alkylthio.

s16) Active ingredients which are used primarily as herbicides but also have safener action on crop plants, for example
(2,4-dichlorophenoxy)acetic acid (2,4-D),
(4-chlorophenoxy)acetic acid,
(R,S)-2-(4-chloro-o-tolyloxy)propionic acid (mecoprop),
4-(2,4-dichlorophenoxy)butyric acid (2,4-DB),
(4-chloro-o-tolyloxy)acetic acid (MCPA),
4-(4-chloro-o-tolyloxy)butyric acid,
4-(4-chlorophenoxy)butyric acid,
3,6-dichloro-2-methoxybenzoic acid (dicamba),
1-(ethoxycarbonyl)ethyl 3,6-dichloro-2-methoxybenzoate (lactidichlor-ethyl).

Preferred safeners s) are selected from the group of isoxadifen-ethyl, cyprosulfamide, cloquintocet-mexyl and mefenpyr-diethyl. Particular preference is given to mefenpyr-diethyl and cloquintocet-mexyl. Very particular preference is given to mefenpyr-diethyl.

Particular preference is given to active herbicidal ingredients a') selected from the group of:
flufenacet, prosulfocarb, pendimethalin, diflufenican, aclonifen, metribuzin, pyroxasulfone, propoxycarbazone, thiencarbazone-methyl, fenoxaprop, bromoxynil, halauxifen-methyl, 2,4-D, MCPA.

Very particular preference is given to the active herbicidal ingredients a) flufenacet, pyroxasulfone, diflufenican.

Particular preference is also given to mixtures of one or more active herbicidal ingredients a') selected from the group of:
flufenacet and pethoxamid; flufenacet and aclonifen; flufenacet and metribuzin; flufenacet and halauxifen-methyl; prosulfocarb and diflufenican; prosulfocarb and aclonifen; prosulfocarb and metribuzin; prosulfocarb and flufenacet; prosulfocarb and halauxifen-methyl; pendimethalin and diflufenican;

pendimethalin and aclonifen; pendimethalin and metribuzin; pendimethalin and halauxifen-methyl; metribuzin and diflufenican; halauxifen-methyl and diflufenican; flufenacet and diflufenican; metribuzin and aclonifen, halauxifen-methyl and aclonifen; pyroxasulfone and diflufenican; aclonifen and diflufenican; pyroxasulfone and prosulfocarb; pyroxasulfone and aclonifen; pyroxasulfone and metribuzin; pyroxasulfone and flufenacet; pyroxasulfone and halauxifen-methyl or flufenacet and pyroxasulfone and dilflufenican; aclonifen and diflufenican and flufenacet; metribuzin and diflufenican and flufenacet.

The mixtures are most preferably selected from: flufenacet and diflufenican; flufenacet and pyroxasulfone; aclonifen and diflufenican; metribuzin and diflufenican; flufenacet and aclonifen; flufenacet and metribuzin; flufenacet and pyroxasulfone and dilflufenican; aclonifen and diflufenican and flufenacet; metribuzin and diflufenican and flufenacet.

The active herbicidal ingredients a') mentioned and mixtures thereof may likewise be used with a safener s) selected from the group of isoxadifen-ethyl, cyprosulfamide, cloquintocet-mexyl and mefenpyr-diethyl.

Most preferably, the mixtures comprising a') and s) are selected from: flufenacet and diflufenican and mefenpyr-diethyl; flufenacet and diflufenican and cloquintocet-mexyl, aclonifen and diflufenican and mefenpyr-diethyl; pyroxasulfone and mefenpyr-diethyl.

Suitable anionic dispersants e1), such as emulsifiers, surfactants, wetting agents and dispersers, are, for example, alkali metal, alkaline earth metal or ammonium salts of sulfonates, sulfates, phosphates, carboxylates and mixtures thereof, for example the salts of alkylsulfonic acids or alkylphosphoric acids and alkylarylsulfonic or alkylarylphosphoric acids, diphenylsulfonates, alpha-olefinsulfonates, lignosulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols or of fatty acid esters. Examples of phosphates are phosphate esters. Examples of carboxylates are alkyl carboxylates and carboxylated alcohol ethoxylates or alkylphenol ethoxylates.

Likewise suitable is the group of anionic emulsifiers of the alkali metal, alkaline earth metal and ammonium salts of the polystyrenesulfonic acids, salts of the polyvinylsulfonic acids, salts of the alkylnaphthalenesulfonic acids, salts of alkylnaphthalenesulfonic acid-formaldehyde condensation products, salts of condensation products of naphthalenesulfonic acid, phenolsulfonic acid and formaldehyde. Examples are calcium dodecylbenzenesulfonate such as Rhodocal® 70/B (Solvay), Phenylsulfonat CA100 (Clariant) or isopropylammonium dodecylbenzenesulfonates such as Atlox® 3300B (Croda).

Further typical representatives include Phenylsulfonat CA (calcium dodecylbenzenesulfonate), Soprophor® products (optionally esterified derivatives of tristyrylphenol ethoxylates), Emulsogen® 3510 (alkylated EO/PO copolymer), Emulsogen® EL 400 (ethoxylated castor oil), Tween® products (fatty acylated sorbitan ethoxylates), Calsogen® AR 100 (calcium dodecylbenzenesulfonate). Preference is given to combinations of salts of alkylated aromatic sulfonic acids, such as calcium phenylsulfonate and/or Calsogen® AR 100, with alkylated copolymers of ethylene oxide and propylene oxide, such as Emulsogen® 3510. Particular preference is given to combinations of salts of dodecylbenzenesulfonic acid, such as Calsogen® AR 100, with alkylated copolymer of ethylene oxide and propylene oxide, such as Emulsogen® 3510.

Examples of further anionic emulsifiers e1) from the group of the naphthalenesulfonates are Galoryl® MT 800 (sodium dibutylnaphthalenesulfonate), Morwet® IP (sodium diisopropylnaphthalenesulfonate) and Nekal® BX (alkylnaphthalenesulfonate). Examples of anionic surfactants from the group of the condensates of naphthalenesulfonates with formaldehyde are Galoryl® DT 201 (naphthalenesulfonic acid hydroxy polymer with formaldehyde and methylphenol sodium salt), Galoryl® DT 250 (condensate of phenol- and naphthalenesulfonates), Reserve® C. (condensate of phenol- and naphthalenesulfonates) or Morwet® D-425, Tersperse® 2020. Preference is given to 1,2-dibutyl- or -diisobutyl-substituted naphthalenesulfonates, for example products such as Galoryl® MT 800 (CFPI-Nufarm) and Nekal® BX (BASF). Further typical surfactants are Soprophor® 3D33, Soprophor® 4D384, Soprophor® BSU, Soprophor® CY/8 (Solvay) and Hoe® 53474, and in the form of the Sapogenat® T products (Clariant), for example Sapogenat® T 100.

Useful nonionic dispersants e2), such as emulsifiers, wetting agents, surfactants and dispersers, include standard surface-active substances present in formulations of active agrochemical ingredients. Examples include ethoxylated nonylphenols, reaction products of linear or branched alcohols with ethylene oxide and/or propylene oxide, ethylene oxide-propylene oxide block copolymers, end group-capped and non-end group-capped alkoxylated linear and branched, saturated and unsaturated alcohols (e.g. butoxy polyethylene-polypropylene glycols), reaction products of alkylphenols with ethylene oxide and/or propylene oxide, ethylene oxide-propylene oxide block copolymers, polyethylene glycols and polypropylene glycols, and also fatty acid esters, fatty acid polyglycol ether esters, alkylsulfonates, alkylsulfates, arylsulfates, ethoxylated arylalkylphenols, for example tristyrylphenol ethoxylate having an average of 16 ethylene oxide units per molecule, and also ethoxylated and propoxylated arylalkylphenols, and also sulfated and phosphated arylalkylphenol ethoxylates or ethoxy- and propoxylates. Particular preference is given to tristyrylphenol alkoxylates and fatty acid polyglycol ether esters. Very particular preference is given to tristyrylphenol ethoxylates, tristyrylphenol ethoxy propoxylates and castor oil polyglycol ether esters, in each case individually or in mixtures. Additives may additionally be useful, such as surfactants or esters of fatty acids, which contribute to improvement in biological efficacy. Suitable nonionic emulsifiers b2) are, for example, Soprophor® 796/P, Lucramul® CO30, Lucramul® HOT, Lucramul® PSI 100 or Synperonic® T304.

Suitable nonionic dispersers e2) may likewise be selected from the group comprising polyvinylpyrrolidone (PVP), polyvinyl alcohol, copolymer of PVP and dimethylaminoethyl methacrylate, butylated PVP, copolymer of vinyl chloride and vinyl acetate, and partially hydrolysed vinyl acetate, phenol resins, modified cellulose types, for example Luviskol® (polyvinylpyrrolidone), Mowiol® (polyvinyl alcohol) or modified cellulose. Preference is given to polyvinylpyrrolidone types, particular preference to types of low molecular weight such as Luviskol® K30 or Sokalan® K30.

Useful further nonionic emulsifiers e2) from the group of the di- and triblock copolymers of alkylene oxides are, for example, compounds based on ethylene oxide and propylene oxide, having mean molar masses between 200 and 10000 and preferably 1000 to 4000 g/mol, where the proportion by mass of the polyethoxylated block varies between 10% and 80%, for example the Synperonic® PE series (Uniqema), the Pluronic® PE series (BASF), the VOP® 32 or Genapol® PF series (Clamant).

In the case of use of safeners as component a'), carrier materials f) are used in the SCs.

Suitable carrier materials f) are selected from the group of the highly absorptive carriers having an absorption capacity of at least 200 g of dibutyl phthalate per 100 g of carrier material.

Preferred highly absorptive carriers f) are silicas, for example Sipernat® products (synthetic precipitated silica of high absorptivity) and fumed silica (Aerosil® products). Preference is given to precipitated silica.

The capsule suspension concentrates according to the invention are of excellent suitability for application of the active agrochemical ingredients present to plants and/or the habitat thereof. They ensure the release of the active components in the respective desired amount over a relatively long period of time.

The capsule suspension concentrates according to the invention can be used in practice either as such or after dilution with water. Application is effected by customary methods, i.e., for example by pouring or spraying.

The application rate of capsule suspension concentrates according to the invention may be varied within a relatively wide range. It is guided by the active agrochemical ingredients in question and by the content thereof in the microcapsule formulations.

A preferred use of the capsule suspension concentrates according to the invention is as a herbicide in cereals and oilseed rape, most preferably in winter barley and in this context in a pre-emergence method and in a post-emergence method. Preference is therefore given to use in an autumn application shortly after the sowing of the cereal and shortly before or shortly after germination of the weeds and in particular weed grasses.

The capsule suspension concentrates according to the invention can be produced by known processes, for example as mixed formulations of the individual components, optionally with further active ingredients, additives and/or customary formulation auxiliaries, and these are then applied in a customary manner diluted with water, or as tankmixes by joint dilution of the separately formulated or partly separately formulated individual components with water. Likewise possible is the application at different times (split application) of the separately formulated or partly separately formulated individual components. It is also possible to apply the individual components or the capsule suspension concentrates according to the invention in a plurality of portions (sequential application), for example by pre-emergence applications followed by post-emergence applications or by early post-emergence applications followed by medium or late post-emergence applications. Preference is given to the joint or immediately successive application of the active ingredients in the respective combination.

Accordingly the present invention further provides a method of controlling unwanted plants in plant crops, which is characterized in that the capsule suspension concentrates according to the invention are deployed on the plants (for example harmful plants such as mono- or dicotyledonous weeds or unwanted crop plants) or the area on which the plants grow.

Unwanted plants are understood to mean all plants which grow at sites where they are unwanted. These can be, for example, harmful plants (e.g. mono- or dicotyledonous weeds or unwanted crop plants).

Monocotyledonous weeds come, for example, from the genera: *Aegilops, Agropyron, Agrostis, Alopecurus, Apera, Avena, Brachiaria, Bromus, Cenchrus, Commelina, Cynodon, Cyperus, Dactyloctenium, Digitaria, Echinochloa, Eleocharis, Eleusine, Eragrostis, Eriochloa, Festuca, Fimbristylis, Heteranthera, Imperata, Ischaemum, Leptochloa, Lolium, Monochoria, Panicum, Paspalum, Phalaris, Phleum, Poa, Rottboellia, Sagittaria, Scirpus, Setaria*, and *Sorghum*.

Dicotyledonous weeds come, for example, from the genera *Abutilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erysimum, Euphorbia, Galeopsis, Galinsoga, Galium, Hibiscus, Ipomoea, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola* and *Xanthium*.

Preferably, the capsule suspension concentrates according to the invention are used to control the weed of the *Alopecurus myosuroides* species HUDS (or black grass).

The invention also provides for the use of the capsule suspension concentrates according to the invention for control of unwanted plant growth, preferably in crops of useful plants.

If the capsule suspension concentrates according to the invention are applied to the soil surface before germination, either the emergence of the weed seedlings is prevented completely or the weeds grow until they have reached the cotyledon stage, but then they stop growing and ultimately die completely after three to four weeks have passed.

When the capsule suspension concentrates according to the invention compositions are applied post-emergence to the green parts of the plants, growth likewise stops rapidly a very short time after the treatment, and the weed plants remain at the growth stage at the time of application, or they die completely after a certain time, such that competition by the weeds, which is harmful to the crop plants, is thus eliminated very early and in a sustained manner.

The capsule suspension concentrates according to the invention are notable for a rapid onset and long duration of herbicidal action. Said properties and advantages are beneficial in practical weed control in order to keep agricultural crops clear of unwanted competing plants and hence to ensure and/or increase the yields in terms of quality and quantity. These novel compositions markedly exceed the technical state of the art with a view to the properties described.

Even though the capsule suspension concentrates according to the invention have excellent herbicidal activity against monocotyledonous and dicotyledonous weeds, there is only insignificant damage, if any, to crop plants of economically important crops, for example dicotyledonous crops such as soya, cotton, oilseed rape, sugar beet, or gramineous crops such as wheat, barley, rye, oats, millet/sorghum, rice or corn.

For these reasons, the capsule suspension concentrates according to the invention are highly suitable for selective control of unwanted plant growth in agriculturally useful plants or in ornamental plants.

In addition, the capsule suspension concentrates according to the invention have excellent growth-regulatory properties in crop plants. They intervene in the plants' own metabolism with regulatory effect, and can thus be used for the controlled influencing of plant constituents and to facilitate harvesting, for example by triggering desiccation and stunted growth. In addition, they are also suitable for general control and inhibition of unwanted vegetative growth without killing the plants. Inhibition of vegetative growth plays a major role for many mono- and dicotyledonous crops since this can reduce or completely prevent lodging.

By virtue of their herbicidal and plant growth regulatory properties, the capsule suspension concentrates according to the invention can also be used to control harmful plants in crops of genetically modified plants which are known or are yet to be developed. In general, the transgenic plants are characterized by particular advantageous properties, for example by resistances to certain pesticides, in particular certain herbicides, resistances to plant diseases or pathogens of plant diseases, such as certain insects or microorganisms such as fungi, bacteria or viruses. Other specific characteristics relate, for example, to the harvested material with regard to quantity, quality, storability, composition and specific constituents. For instance, there are known transgenic plants with an elevated starch content or altered starch quality, or those with a different fatty acid composition in the harvested material.

Preference is given to the use of the capsule suspension concentrates according to the invention in economically important transgenic crops of useful and ornamental plants, for example of gramineous crops such as wheat, barley, rye, oats, millet/sorghum, rice, oilseed rape and maize. Preferably, the compositions according to the invention can be used as herbicides in crops of useful plants which are resistant, or have been made resistant by genetic engineering, to the phytotoxic effects of the herbicides. Particular preference is given to use on wheat, barley, rye and oilseed rape, preferably winter oilseed rape.

When the capsule suspension concentrates according to the invention are employed in transgenic crops, not only do the effects toward harmful plants observed in other crops occur, but frequently also effects which are specific to application in the particular transgenic crop, for example an altered or specifically widened spectrum of weeds which can be controlled, altered application rates which can be used for the application, preferably good combinability with the herbicides to which the transgenic crop is resistant, and influencing of growth and yield of the transgenic crop plants.

The present invention also further provides a method of controlling unwanted plant growth, preferably in crop plants such as cereals (e.g. wheat, barley, rye, oats, rice, corn, millet/sorghum), more preferably in monocotyledonous crops such as cereals, for example wheat, barley, rye, oats, crossbreeds thereof, such as triticale, rice, corn and millet/sorghum, wherein one or more capsule suspension concentrates according to the invention are applied to the harmful plants, plant parts, plant seeds or the area in which the plants grow, for example the area under cultivation in the. Preferably, the capsule suspension concentrates according to the invention are applied pre-emergence and post-emergence. More preferably pre-emergence.

The invention therefore also provides for the use of the capsule suspension concentrates according to the invention for control of harmful plants in transgenic crop plants.

The invention further preferably provides for the use of the capsule suspension concentrates according to the invention for treatment of plants where the seed has been treated with safener.

The invention is illustrated by the examples below.

EXAMPLES

Substances and Abbreviations Used:

The terms used in the examples below have the following meanings:
- mefenpyr-diethyl diethyl (RS)-1-(2,4-dichlorophenyl)-5-methyl-2-pyrazoline-3,5-dicarboxylate, (Bayer CropScience AG), melting range 50-55° C.
- flufenacet 4'-fluoro-N-isopropyl-2-(5-trifluoromethyl-1,3,4-thiadiazol-2-yloxy)acetanilide (Bayer CropScience AG)
- diflufenican 2',4'-difluoro-2-(α,α,α-trifluoro-m-tolyloxy) nicotinanilide (Bayer CropScience AG)
- cloquintocet-mexyl (RS)-1-methylhexyl (5-chloroquinolin-8-yloxy)acetate (Syngenta), melting range 60-70° C.
- clomazone CPMI, CAS 81777-89-1, IUPAC 2-(2-chlorobenzyl)-4,4-dimethyl-1,2-oxazolidin-3-one
- DCPMI 2-[(2,4-dichlorophenyl)methyl]-4,4'-dimethyl-3-isoxazolidinone (CAS Number 81777-95-9 or IPUAC 2-(2,4-dichlorobenzy0-4,4-dimethyl-1,2-oxazolidin-3-one, abbreviated hereinafter to DCPMI)
- Morwet® D-425 naphthalenesulfonic acid/formaldehyde condensate, sodium salt (Akzo Nobel)
- Pluronic® PE 10500 propylene oxide-ethylene oxide (PO-EO) block polymer (BASF)
- citric acid polybasic organic acid
- Rhodopol® G xanthan derivative (Solvay)
- Silcolapse® 426R, 411 silicone defoamer (Solvay)
- glycerol antifreeze
- Proxel® GXL preservative (biocide, Proxel)
- Solvesso® 200 ND mineral oil, ExxonMobil, naphthalene-free
- Desmodur® 44V20L polymeric MDI, Covestro AG, functionality 2.7.
- Desmodur® T80 diisocyanate, functionality 2.0, Covestro AG, based on tolylene diisocyanate
- DETA diethylenetriam, Sigma-Aldrich
- HDA hexamethylene-1,6-diam, BASF
- Kuraray Poval® 26-88 polyvinyl alcohol from Kuraray, about 88% hydrolysed polyvinyl acetate
- Desmodur® N3300 modified, trimerized aliphatic polyisocyanate based on HDI, Covestro AG, functionality 3.3; free monomeric isocyanate <0.5%.
- Rhodocal® 60BE ionic emulsifier, Solvay, calcium dodecylsulfate
- Emulsogen® EL 400 nonionic emulsifier, Croda, castor oil with 40 ethylene oxide units

Production Example

Example 1 (Inventive)

15 g of DCPMI were dissolved at 50° C. in 32 g of Solvesso® 200 ND (corresponding to 32% dissolved active ingredient).

The solution was added to a mixture of 0.8 g of Desmodur® T80, 0.64 g of Desmodur® 44V20L, 0.51 g of Kuraray Poval® 26-88, and also 0.2 g of Silcolapse® 426R and 0.18 g of Kathon® CG/ICP in 50 g of water. The mixture was dispersed with a disperser at 15000 rpm for 10 minutes. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 8.3 μm (d90) is obtained.

Example 2 (Inventive)

15 g of DCPMI were dissolved at 50° C. in 32 g of Solvesso® 200 ND (corresponding to 32% dissolved active ingredient).

The solution was added to a mixture of 0.8 g of Desmodur®® T80, 0.64 g of Desmodur® 44V20L, 0.51 g of Kuraray Poval® 26-88, and also 0.2 g of Silcolapse® 426R and 0.18 g of Kathon® CG/ICP in 50 g of water. The mixture was dispersed with a disperser (rotor-stator system) at 10 000 rpm for 10 minutes. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 15.3 μm (d90) is obtained.

Example 3 (Inventive)

15 g of DCPMI were dissolved at 50° C. in 32 g of Solvesso® 200 ND (corresponding to 32% dissolved active ingredient).

The solution was added to a mixture of 1.4 g of Desmodur® T80, 1.09 g of Desmodur® 44V20L, 0.51 g of Kuraray Poval® 26-88, and also 0.2 g of Silcolapse® 426R and 0.18 g of Kathon® CG/ICP in 50 g of water. The mixture was dispersed with a disperser at 15 000 rpm for 10 minutes. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 8.3 µm (d90) is obtained.

Example 4 (Inventive)

15 g of DCPMI were dissolved at 50° C. in 32 g of Solvesso® 200 ND (corresponding to 32% dissolved active ingredient).

The solution was added to a mixture of 0.6 g of Desmodur® T80, 0.48 g of Desmodur® 44V20L, 0.51 g of Kuraray Poval® 26-88, and also 0.2 g of Silcolapse® 426R and 0.18 g of Kathon® CG/ICP in 50 g of water.

The mixture was dispersed with a disperser at 15 000 rpm for 10 minutes. Thereafter, 0.36 g of diethylenetriam is added. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 6.6 µm (d90) is obtained.

Example 5 (Inventive)

15 g of DCPMI were dissolved at 50° C. in 32 g of Solvesso® 200 ND (corresponding to 32% dissolved active ingredient).

The solution was added to a mixture of 0.9 g of Desmodur® 44V20L, 0.51 g of Kuraray Poval® 26-88, and also 0.2 g of Silcolapse® 426R and 0.18 g of Kathon® CG/ICP in 50 g of water. The mixture was dispersed with a disperser at 15 000 rpm for 10 minutes. Thereafter, 0.54 g of hexamethylene-1,6-diam dissolved in water (as a 40% by weight solution) was added. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 7.9 µm (d90) is obtained.

Example 6 (Inventive)

15 g of DCPMI were dissolved at 50° C. in 32 g of Solvesso® 200 ND (corresponding to 32% dissolved active ingredient).

The solution was added to a mixture of 1.22 g of Desmodur® N3300 g, 0.51 g of Kuraray Poval® 26-88, and also 0.2 g of Silcolapse® 426R and 0.18 g of Kathon® CG/ICP in 50 g of water. The mixture was dispersed with a disperser at 15 000 rpm for 10 minutes. Thereafter, 0.44 g of a 50% by weight solution of diethylenetriamine in water is added. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a DCPMI content of 150 g/l and a particle size of 5.4 µm (d90) is obtained.

Comparative Example 1 (Analogous to WO 96/14743, Table 1, Example c)

140 g of clomazone were dissolved at 50° C. in 30 g of Solvesso® 200 ND (corresponding to 82% dissolved active ingredient).

The solution was added to a mixture of 30 g of Desmodur® 44V20L, 4 g of Kuraray Poval® 26-88, 430 g of water and also 1.8 g of Silcolapse® 426R and 0.18 g of Kathon® CG/ICP. The mixture was dispersed with a disperser at 10 000 rpm within 10 minutes. Subsequently, 19 g of hexamethylene-1,6-diamine are added. The resulting reaction mixture is heated up to 70° C. within one hour and kept at 70° C. with gentle stirring for a further 4 hours. After subsequent cooling to room temperature, 0.58 g of a 30% aqueous ammonia solution is added. The mixture is thickened with 0.2 g of Rhodopol® G. In this way, a microcapsule formulation having a clomazone content of 200 g/l and a particle size of 15.3 µm (d90) is obtained.

The ratio of active ingredient to isocyanate is 4.6:1.

The ratio of active ingredient to solvent is 4.6:1.

The ratio of isocyanate to aminic crosslinker is 1.58:1.

Comparative Example 2a (with DCPMI, Analogous to WO 96/14743, Table 1, Example c)

DCPMI is much more sparingly soluble than clomazone. It was not possible to conduct the batch mixing.

Comparative Example 2b (with DCPMI, Variation of Comparative Example 1 with DCPMI Dissolved in Solvesso® 200 ND)

The procedure of Comparative Example 1 was followed, except that 15 g of DCPMI were dissolved at 50° C. in 32 g of Solvesso® 200 ND (corresponding to 32% dissolved active ingredient).

The ratio of active ingredient to isocyanate is 4.6:1.

The ratio of active ingredient to solvent is 1:2.

The ratio of isocyanate to aminic crosslinker is 1.58:1.

Much more polyurethane/urea is used than in the formulations according to the invention.

Comparative Example 3 (Analogous to WO 2015/127259, Example 9a)

A capsule suspension was produced analogously to Example 9a.

The ratio of active ingredient to isocyanate is 16.8:1.

The ratio of active ingredient to solvent is 5.6:1. 85% active ingredient is present in relation to solvent.

The ratio of isocyanate to aminic crosslinker is 1:1.

The active ingredient in the capsules partly crystallized out at room temperature. Some capsules broke open. The same high sieve residues as in WO 2015/127259 Example 9A were found. It was not possible to use the products any further since they block the syringe and are not storage-stable, but it was possible to determine the volatility.

Comparative Example 4 (Analogous to WO 2015/127259, Example 9b)

A capsule suspension was produced analogously to Example 9b.

The ratio of active ingredient to isocyanate is 18.2:1.

The ratio of active ingredient to solvent is 6:1. 85% active ingredient is present in relation to solvent.

The ratio of isocyanate to aminic crosslinker is 1:1.

The active ingredient in the capsules partly crystallized out at room temperature. Some capsules broke open. The same high sieve residues as in WO 2015/127259 Example 9A were found. It was not possible to use the products any further since they block the syringe and are not storage-stable, but it was possible to determine the volatility.

Comparative Example 5 (Analogous to WO 2015/127259, Example 9c)

A capsule suspension was produced analogously to Example 9c.

The ratio of active ingredient to isocyanate is 12:1.

The ratio of active ingredient to solvent is 1.44:1. 60% active ingredient is present in relation to solvent.

The ratio of isocyanate to aminic crosslinker is 1:1.

The active ingredient in the capsules partly crystallized out at room temperature. Some capsules broke open. The same high sieve residues as in WO 2015/127259 Example 9A were found. It was not possible to use the products any further since they block the syringe and are not storage-stable, but it was possible to determine the volatility.

The solubility of the active ingredient in Solvesso 200 ND was determined as 35% by weight at room temperature. At higher concentrations, the active ingredient crystallizes out in the capsule.

Production of a Suspension Concentrate (SC):

First of all, water is initially charged at room temperature. While stirring, subsequently, c, e1, e2, and active ingredients a and a) are added. In the case of a') menfenpyr-diethyl, it is added warm at 65° C. and the mixture is stirred for 2 to 24 h until crystals form. This is followed by wet grinding, for example by means of a bead mill. Finally, the organic thickener (component c) is added.

Production of an Organic Emulsion Concentrate (EC):

The active ingredient is stirred at 30° C. with the solvent and the emulsifiers.

TABLE 1

Formulations produced (figures are in percent by weight, % by weight)

| | Component | 7 SC | 8 EC | 9 SC | 10 SC | 11 SC | 12 SC | 13 SC |
|---|---|---|---|---|---|---|---|---|
| s | Mefenpyr-diethyl | | | 30 | | | 10 | |
| s | Cloquintocet-mexyl | | | | | 30 | | 10 |
| a | DCPMI | 40 | 10 | | | | | |
| a' | Diflufenican | | | | 20 | | 15 | 15 |
| a' | Flufenacet | | | | 40 | | 30 | 30 |
| e1 | Rhodocal® 60BE | | 4 | | | | | |
| e2 | Emulsogen® EL 400 | | 4 | | | | | |
| e1 | Morwet® D-425 | 1.0 | | 1.0 | 1.0 | 1.0 | 1.0 | 1.0 |
| e2 | Pluronic®PE 10500 | 5 | | 5 | 5 | 5 | 5 | 5 |
| c | citric acid | 0.1 | | 0.1 | 0.1 | 0.1 | 0.1 | 0.1 |
| f | Aerosil® 200 | 0.5 | | 0.5 | | 0.5 | 0.5 | 0.5 |
| c | Rhodopol® 23 | 0.2 | | 0.2 | 0.2 | 0.2 | 0.2 | 0.2 |
| c | Silcolapse® 411 | 0.5 | | 0.5 | 0.5 | 0.5 | 0.5 | 0.5 |
| c | glycerol | 5 | | 5 | 5 | 5 | 5 | 5 |
| c | Proxel® GXL | 0.18 | | 0.18 | 0.18 | 0.18 | 0.18 | 0.18 |
| | Water | 52.48 | | 42.48 | 71.98 | 42.48 | 67.48 | 67.48 |
| | Solvesso® 200 ND | | 82 | | | | | |
| | Total: | 100 | 100 | 100 | 100 | 100 | 100 | 100 |

Production of a ZC Formulation According to the Invention:

The respective SC formulation is mixed with the CS formulation according to the invention:

Example 14

0.12 l of Example 10 (corresponding to 48 g of flufenacet and 24 g of diflufenican) is stirred together with 0.5 l of Example 1 (corresponding to 80 g of encapsulated DCPMI) and 0.1 l (corresponding to 40 g of mefenpyr-diethyl).

Example 15

0.12 l of Example 10 (corresponding to 48 g of flufenacet and 24 g of diflufenican) is stirred together with 0.25 l of Example 1 (corresponding to 40 g of encapsulated DCPMI), and also 0.1 l of Example 7 (corresponding to 40 g of unencapsulated DCPMI) and 0.1 l (corresponding to 40 g of mefenpyr-diethyl).

Determination of the Relative Volatility of the Active Ingredient

A spray liquor (0.5 g of active ingredient/l) is placed onto three Teflon membranes in each case in a glass box open at the top in a laboratory fume hood under a constant air flow of 1.6 m/s at 22° C. and 60% relative air humidity. The residue on the Teflon membranes is determined by HPLC after drying after 0, 24 and 72 h. The volatility is based on the 0 h value.

TABLE 1

Determination of volatility
The amount of active ingredient is the content of DCPMI in % by weight.

| Example | Relative volatility in % after 24 h | Relative volatility in % after 72 h |
|---|---|---|
| 1 | 88 | 85 |
| 8 | 1 | 0 |
| 3 | 90 | 90 |
| 4 | 100 | 100 |
| 7 | 3 | 0 |
| Comparative Example 2b, 3, 4, 5 | 100 | 100 |

The results show that the encapsulation can distinctly reduce volatility.

Determination of Bioavailability by Apple Cuticle Penetration

A spray liquor (0.5 g of active ingredient/l) is applied to three apple cuticles in each case. The amount of active ingredient in the cuticle is measured; determined by HPLC after drying after 0, 24 and 72 h.

TABLE 2

Penetration of DCPMI through the apple cuticle, % by weight

| Example | Cuticle penetration 24 h in % |
|---|---|
| 1 | 25 |
| 8 | 30 |
| 3 | 37 |
| 4 | 20 |
| 7 | 40 |
| Comparative Example 2b, 3, 4, 5 | <5% |

The bioavailability of the inventive examples is at a very high level. Comparative Example 2 shows much too low a bioavailability.

Field Results for the Herbicidal Efficacy of the Aqueous Dispersions

Method: Standard autumn field application of 200 l/ha spray liquors at a dosage of 60 g of diflufenican, 120 g of flufenacet, 200 g of DCPMI and 100 g of mefenpyr-diethyl per hectare. Herbicidal efficacy on black grass (Alopecurus myosuroides; ALOMY), phytotoxicity on the crop plants winter barley and winter wheat, and damage to a neighbouring crop (tree plantation, sugarbeet, broccoli) were evaluated. On a scale of 0-100%, a visual assessment was made by comparison with an untreated control group: 0%=no noticeable effect compared to the untreated control group; 100%=full effect compared to the untreated control group.

TABLE 3

Field results

| Example | Herbicidal activity with respect to ALOMY | Phytotoxicity on winter barley | Phytotoxicity on winter wheat | Damage to neighbouring crops |
|---|---|---|---|---|
| Example 14 in the above dosage | 95% | 5% | 4% | acceptable |
| Example 15 in the above dosage | 95% | 5% | 4% | still just acceptable |
| Example 10 in the above dosage | 55% | 6% | 5% | acceptable |
| Example 1-6 in the above dosage | 20% | 2% | 2% | acceptable |
| Comparative Example 7 in the above dosage | 30% | 15% | 15% | unacceptable |
| Comparative Example 2b in the above dosage | 5% | 1% | 1% | acceptable |

The formulations according to the invention with the active herbicidal ingredients show higher herbicidal efficacy with less damage to the crop plants (phytotoxicity on the crop plants winter barley and winter wheat) with much less damage to neighbouring crops. Example 15 is still just acceptable in this context. A higher amount of free active ingredient (Example 7) leads to unacceptable damage to neighbouring crops. Too thick a capsule wall in the case of encapsulation (Comparative Example 2b) does not have an acceptable effect.

The invention claimed is:
1. Capsule suspension concentrate comprising
A) a particulate disperse phase comprising
   a) a reaction product of at least one compound having isocyanate-reactive group a1) and an isocyanate mixture a2),
   b) 2-[(2,4-dichlorophenyl)methyl-4,4'-dimethyl]-3-isoxazolidinone, dissolved in an organic, water-insoluble solvent b1),
   c) one or more additives and
   c1) at least one protective colloid,
B) a liquid, aqueous phase,
wherein particles of the disperse phase A) have a median particle size between 1 and 50 μm,
wherein
the proportion of a) is between 0.2% and 4.5% by weight,
the proportion of active agrochemical ingredient b) is between 10% and 20% by weight,
the proportion of organic solvent b1) is between 20% and 40% by weight,
the proportion of protective colloids c1) is between 0.3% and 1.5% by weight,
and the proportion of additives c) is between 0.4% and 3% by weight.
2. The capsule suspension concentrate according to claim 1, wherein the organic solvent (b1) is a mixture of 1-methyl- and 2-methylnaphthalene and naphthalene.
3. The capsule suspension concentrate according to claim 1, wherein isocyanate-reactive component a1) comprises water.
4. The capsule suspension concentrate according to claim 1 for control of one or more harmful plants in one or more transgenic crop plants.
5. The capsule suspension concentrate according to claim 1 for treatment of one or more plants where seed has been treated with safener.

6. A process for producing a capsule suspension concentrate according to claim 1, comprising mixing 2-[(2,4-dichlorophenyl)methyl]-4,4'-dimethyl-3-isoxazolidinone b), dissolved in an organic, water-insoluble solvent b1), with the isocyanate mixture a2) and optionally with a further organic solvent and/or emulsifier, the solution thus prepared is then emulsified in water comprising at least one protective colloid c1), optionally in a mixture with further additives c), and the emulsion thus prepared is admixed with a1) and then one or more additives c) are added,
wherein
the proportion of reaction product of the at least one compound having isocyanate reactive group a1) and the isocyanate mixture a2) in the capsule suspension concentrate is between 0.2% and 4.5% by weight,
the proportion of active agrochemical ingredient b) in the capsule suspension concentrate is between 10% and 20% by weight,
the proportion of organic solvent b1) in the capsule suspension concentrate is between 20% and 40% by weight,
the proportion of protective colloids c1) in the capsule suspension concentrate is between 0.3% and 1.5% by weight, and
the proportion of additives c) in the capsule suspension concentrate is between 0.4% and 3% by weight.

7. ZC formulation comprising a capsule suspension concentrate according to claim 1 and at least one suspension concentrate (SCs) comprising
one or more active ingredients a') and/or one or more safeners s),
at least one or more than one thickener c),
one or more anionic emulsifiers e1) and
one or more nonionic emulsifiers e2).

8. The ZC formulation according to claim 7, comprising one or more safeners s),
at least one or more than one thickener c),
at least one or more than one anionic emulsifier e1),
at least one or more than one nonionic emulsifier e2) and
at least one or more than one carrier material f).

9. The ZC formulation according to claim 7, comprising one or more active ingredients a') and one or more safeners s),
at least one or more than one thickener c),
at least one or more than one anionic emulsifier e1),
at least one or more than one nonionic emulsifier e1) and
at least one or more than one carrier material f).

10. A method of controlling one or more unwanted plants in plant crops, comprising deploying the capsule suspension concentrate according to claim 1 on plants, and/or an area on which plants grow.

11. A method of controlling growth of one or more unwanted plants in crop plants, comprising applying the capsule suspension concentrate according to claim 1 to the one or more unwanted plants, plant parts, plant seeds, and/or the area in which the plants grow.

12. The method according to claim 11, wherein the crop plants are one or more cereals and/or oilseed rape.

13. The method according to claim 11, wherein the crop plants are selected from the group consisting of: soya, cotton, oilseed rape, sugar beet, wheat, barley, rye, oats, millet/sorghum, rice, and corn.

14. The method according to claim 11, wherein the crop plants are one or more transgenic crop plants.

15. The method according to claim 11, wherein the capsule suspension concentrate is applied pre-emergence or post-emergence.

16. The method according to claim 11, wherein the capsule suspension concentrate is applied pre-emergence and post-emergence.

17. The method according to claim 11, wherein the one or more unwanted plants are selected from the group consisting of: harmful plants, monocotyledonous weeds, dicotyledonous weeds, and unwanted crop plants.

* * * * *